(12) United States Patent
Huang et al.

(10) Patent No.: US 6,781,277 B2
(45) Date of Patent: Aug. 24, 2004

(54) MICRO-MOTOR WITH LOW COGGING TORQUE

(75) Inventors: Wen-Shi Huang, Chungli (TW); Kuo-Cheng Lin, Taoyuan (TW); Shou Te Yu, Taoyuan (TW); Chin-Hao Liu, Taoyuan Hsien (TW)

(73) Assignee: Delta Electronics Inc., Taoyuan Sien (TW)

( * ) Notice: Subject to any disclaimer, the term of this patent is extended or adjusted under 35 U.S.C. 154(b) by 298 days.

(21) Appl. No.: 10/139,457

(22) Filed: May 6, 2002

(65) Prior Publication Data

US 2002/0171316 A1 Nov. 21, 2002

(30) Foreign Application Priority Data

May 7, 2001 (TW) ...................................... 90207355 U (51) Int. Cl.⁷ ................................................ H02K 1/12
(52) U.S. Cl. ......................... 310/254; 310/216; 310/259
(58) Field of Search ......................... 310/254, 258–259, 310/216–218, 49 R (56) References Cited

U.S. PATENT DOCUMENTS

| 4,899,075 | A | * | 2/1990 | Hasebe ........................ 310/257 |
| 4,987,331 | A | * | 1/1991 | Horng ......................... 310/254 |
| 5,093,599 | A | * | 3/1992 | Horng ......................... 310/254 |
| 5,506,458 | A | * | 4/1996 | Pace et al. ................. 310/67 R |
| 6,441,531 | B1 | * | 8/2002 | Horng et al. ................ 310/216 |
| 6,573,633 | B2 | * | 6/2003 | Horng et al. ................ 310/216 |

* cited by examiner

Primary Examiner—Thanh Lam
(74) Attorney, Agent, or Firm—Thomas, Kayden, Horstemeyer & Risley (57) ABSTRACT

A micro-motor with low cogging torque. The micro-motor includes a stator, a rotor, first and second magnetically conductive assemblies, and a bobbin. The first and second magnetically conductive assemblies are respectively comprised of a plurality of magnetically conductive sheets stacked together. The magnetically conductive sheets are each formed with a plurality of asymmetrical salient teeth. Furthermore, at least one of the magnetically conductive sheets is disposed reversely relative to the other magnetically conductive sheets. The rotor is coupled to the stator.

17 Claims, 8 Drawing Sheets

MICRO-MOTOR WITH LOW COGGING TORQUE

FIELD OF THE INVENTION

The present invention relates to a micro-motor, particularly to a micro-motor that presents low cogging torque in operation.

BACKGROUND OF THE INVENTION

Cogging torque in permanent magnet motors is produced by the magnetic interaction attraction between the permanent magnets and the stator's salient teeth when the current is not provided. Because the direction of the cogging torque is opposite to that of the running torque produced after the current is supplied, the running torque must be counterbalanced a little by the cogging torque such that the motor can be deiven to rotate. In the operation of motors, high cogging torque acts as an obstacle for motor's start-up rotation, a cause of vibration, and a source of noise. It may consequently degrade the motor's life and controllability.

Figure 1A:
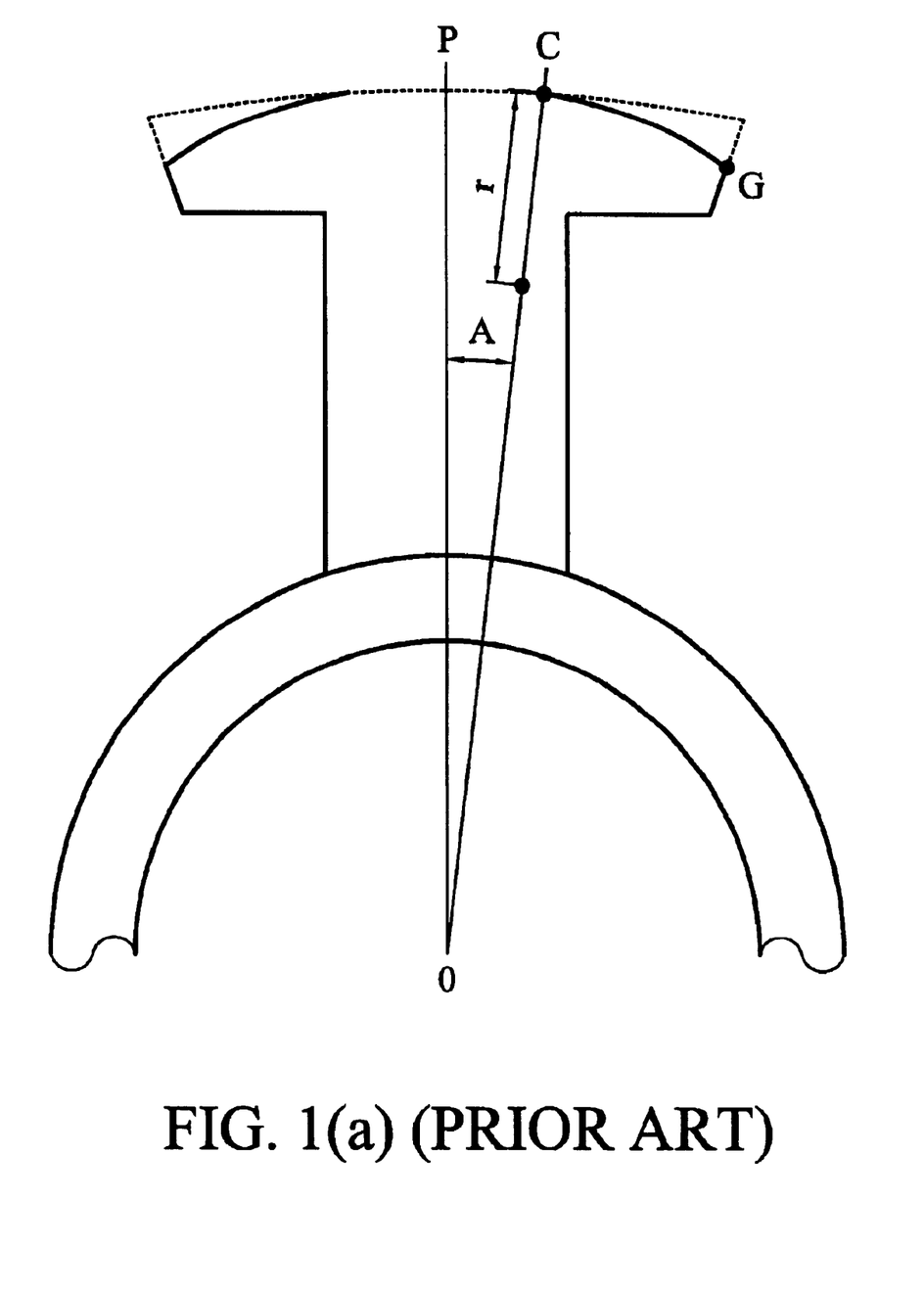
FIG. 1(a) shows the silicon steel sheet disposed in a traditional diametrically air gap type of motor.
Figure 1B:
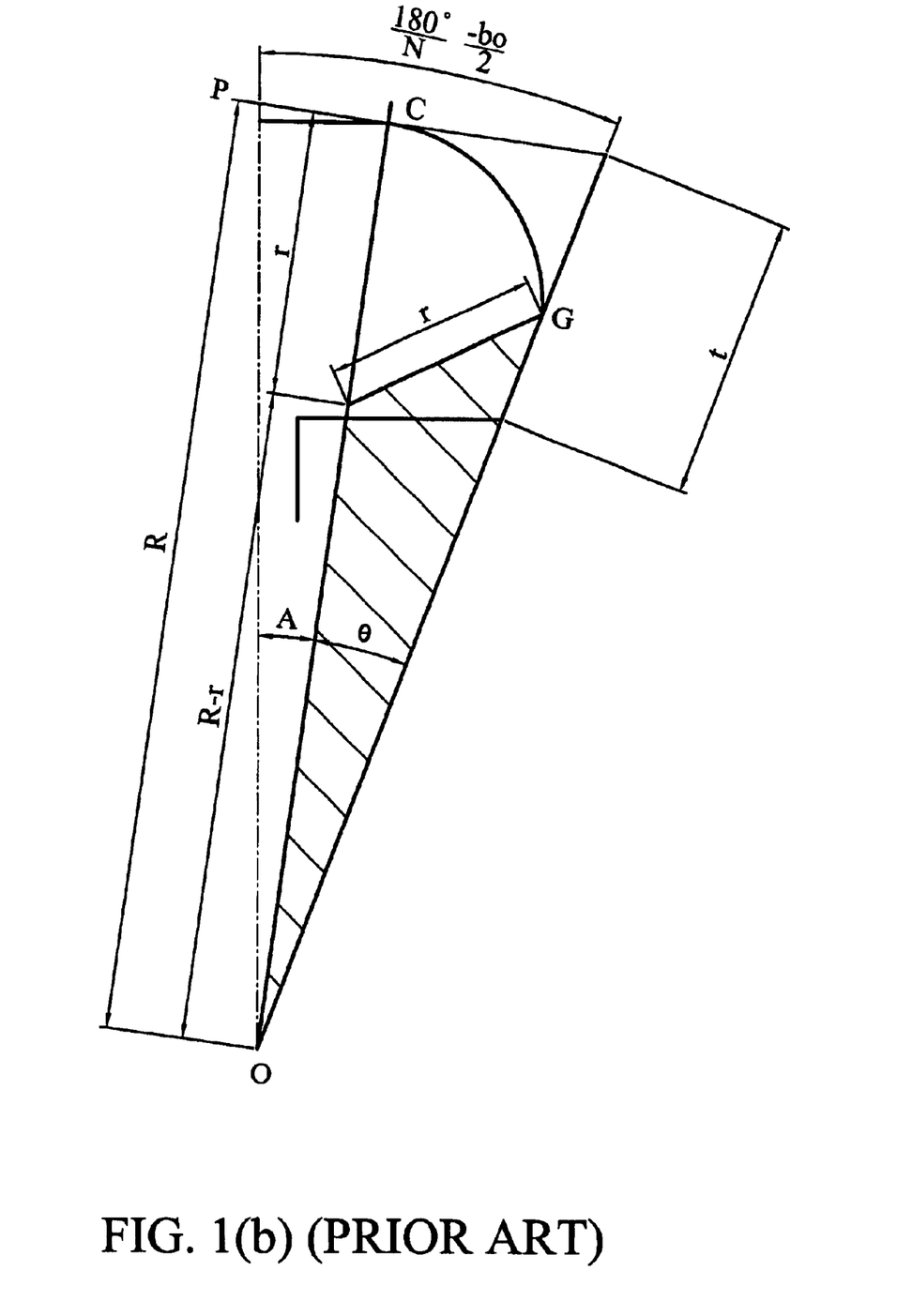
FIG. 1(b) shows a salient pole of the silicon steel sheet shown in FIG. 1(a)

To solve the problem, design goals in prior technology generally focus on optimizing the magnet's magnetization or finding an optimum shape for the stator. In the methods for optimum shape, complex formulas are required. As shown in FIGS. 1(a) and 1(b), U.S. Pat. No. 6,044,737 provides an optimization of the profile of the stator made of silicon steel. In the figure, a salient pole on the stator is profiled along the dash line linking the points P, C, and G. The profile is determined by specific formulas.

In the diametrically wound and diametrical air gap type of brushless motor, as shown in FIG. 1(a), the relation between an angle A of the central arc and a radius r of the modified arc follows the formula:

$$\frac{5}{33}\left(\frac{360°}{N} - b0\right) \le A \le \frac{1}{3}\left(\frac{360°}{N} - b0\right)$$

Where A is half the angle subtended by the central arc, N indicates the number of salient poles, and b0 indicates the angle subtended by the groove opening. Furthermore, as is shown in FIG. 1(b), the radius R and the radius r are preferably within the limits set by the following formula:

$$\frac{2R(R-t)(1-\cos\theta) + t^2}{2[R - (R-t)\cos\theta]} \le r \le \frac{2R\left(R - \frac{t}{4}\right)(1-\cos\theta) + \left(\frac{t}{2}\right)^2}{2\left[R - \left(R - \frac{t}{4}\right)\cos\theta\right]}$$

$$\theta = \frac{180°}{N} - \frac{b0}{2} - A$$

Where, R indicates the radius of the central arc and t indicates the thickness at the edge of the teeth section.

Figure 1C:
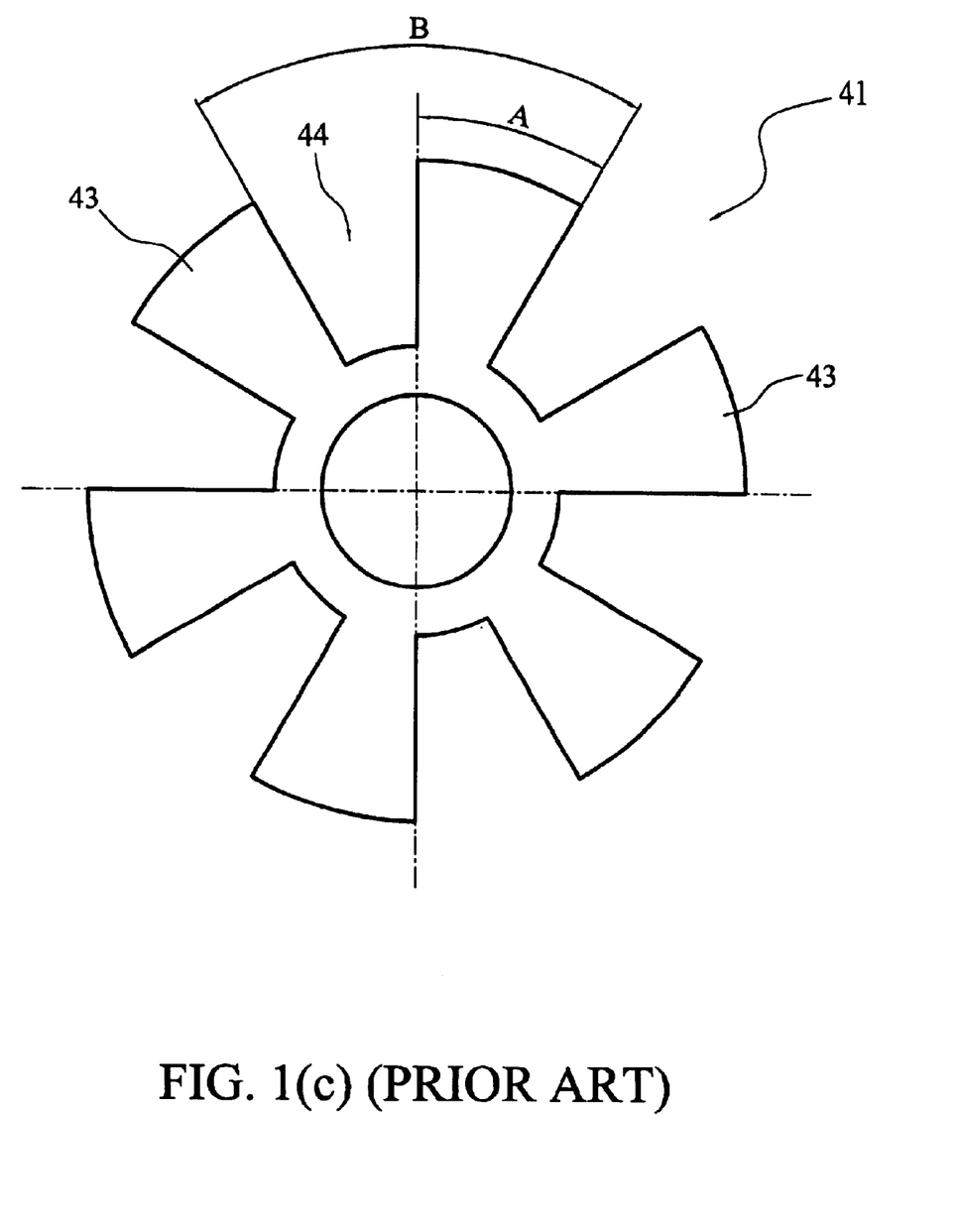
FIG. 1(c) shows the silicon steel sheet disposed in a traditional axially air gap type of motor.

In another kind of prior technology, a "slot-pole ratio", which indicates the ratio of a slot angle to a pitch angle, is optimized to decrease the cogging torque. As shown in FIG. 1(c), Taiwan Patent No. 404621 proposes an axially coiled air gap type of motor including a silicon steel sheet 41 that comprises a plurality of salient poles 43. Each of the salient poles 43 has a symmetrical profile, such as the arc shown in the figure. An aperture 44 is formed between each of the adjacent pole pairs. In this patent shown in FIG. 1(c), to optimize the profile, the ratio of aperture angle (B-A) to pitch angle (indicated by B) is preferably between 0.55 and 0.68.

These prior arts, however, have many disadvantages. For example, the formulas for the stator's profile are rather complex, and this profiling method is not adequate for the manufacture of micro-motors. Thus, it is preferable to propose an innovative design to solve the cogging torque problem.

SUMMARY OF THE INVENTION

The present invention proposes a micro-motor with low cogging torque. The configuration of the micro-motor according to the present invention is much simpler than that of the prior technology. Furthermore, in the assembly of the present invention, conventionally used silicon steel sheets may satisfy the functional requirement of the micro-motor thereby greatly reducing the manufacturing time and cost. A new profile of the silicon steel sheet, which relates to cost increase, is therefore not necessary.

The micro-motor of the present invention is comprised of a stator and a rotor. The stator is comprised of a plurality of magnetically conductive sheets stacked together. The magnetically conductive sheets are each formed with a plurality of a symmetrical salient teeth. Furthermore, in the magnetically conductive stack, one of the magnetically conductive sheets is disposed reversely relative to the other magnetically conductive sheets.

BRIEF DESCRIPTION OF THE DRAWINGS

The present invention can be fully understood from the following detailed description and preferred embodiment with reference to the accompanying drawings in which.

DETAILED DESCRIPTION OF THE INVENTION

Figure 2A:
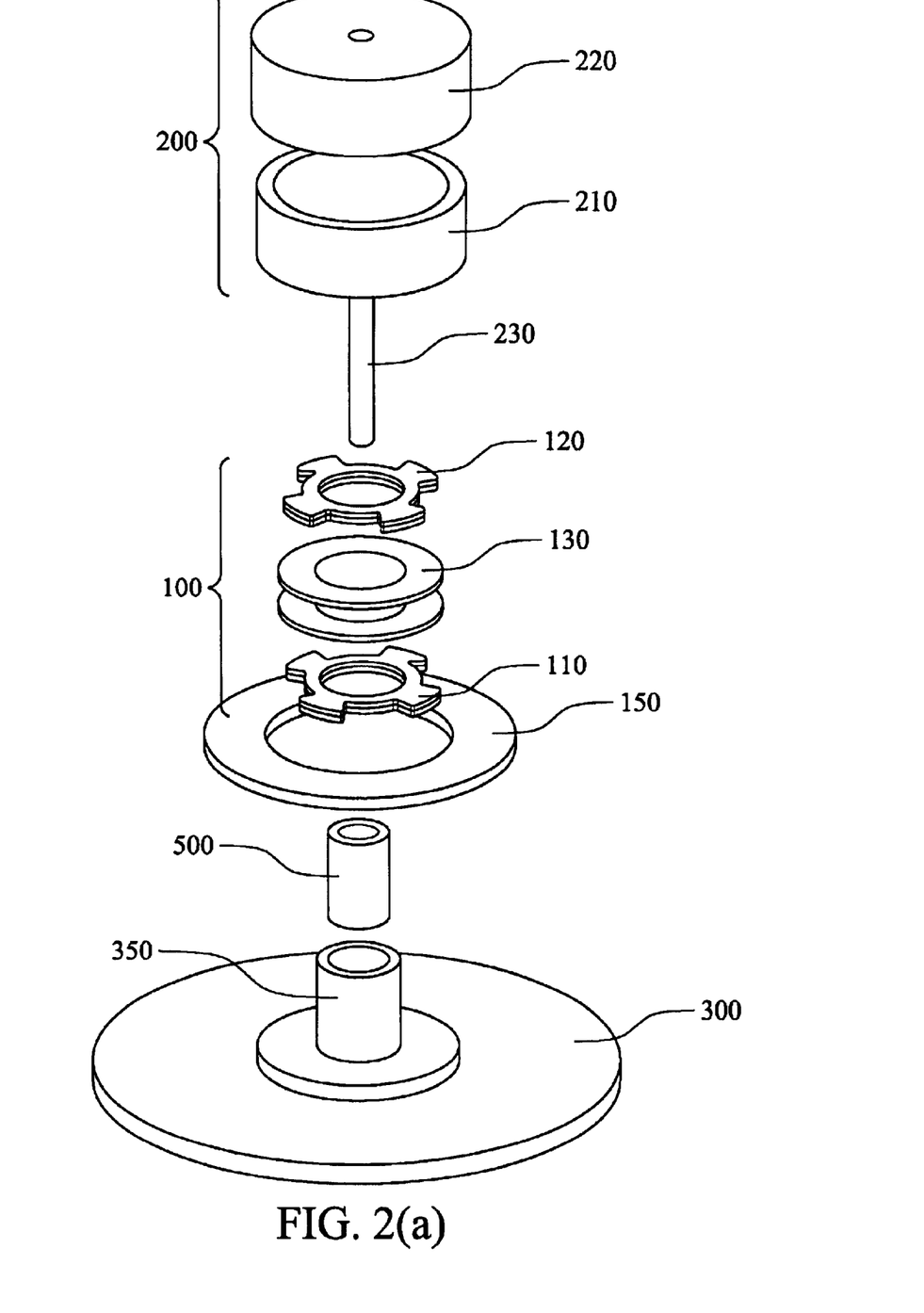
FIG. 2(a) shows an exploded view of a micro-motor according to the present invention.
Figure 2B:
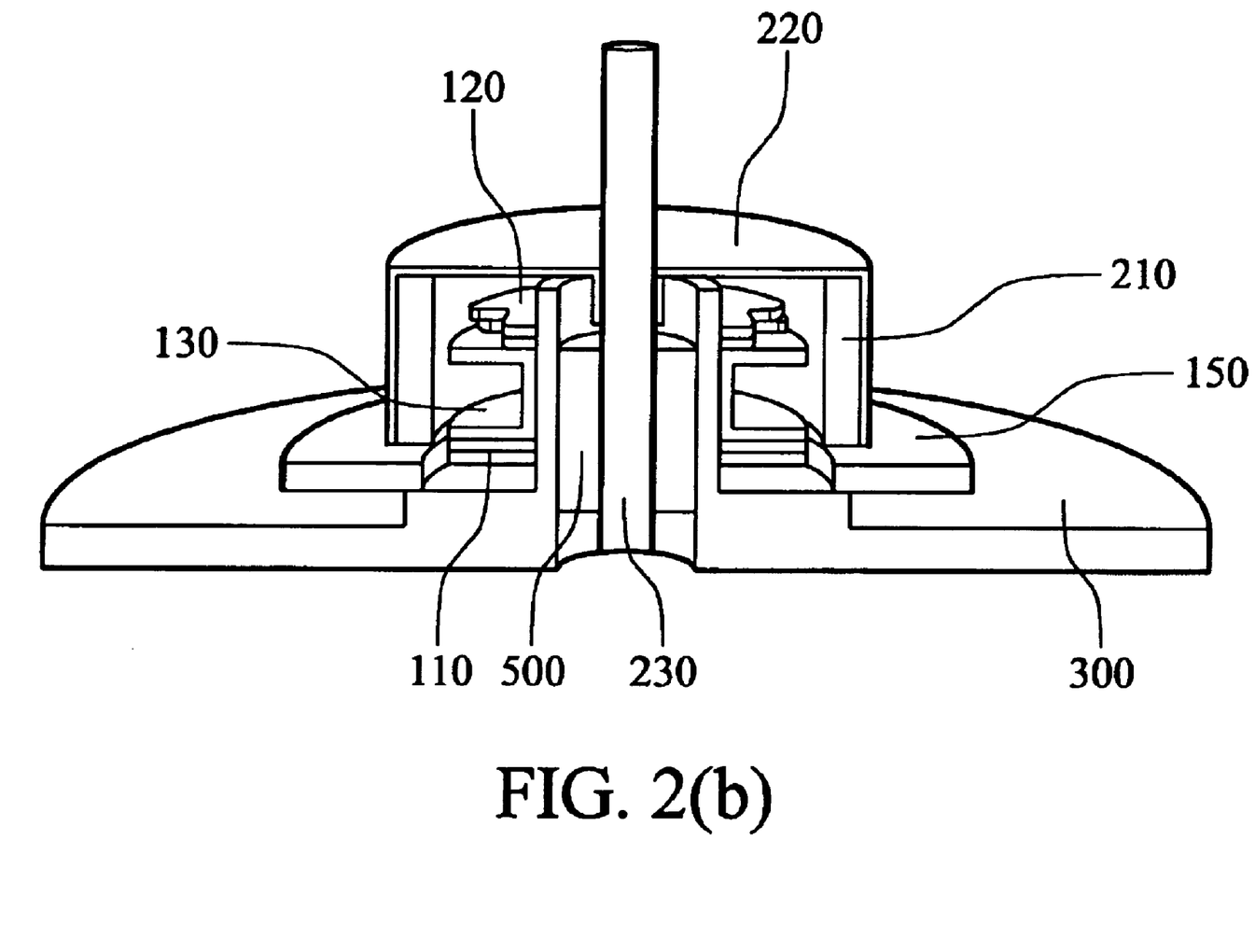
FIG. 2(b) shows a perspective cross-section of a micro-motor according to the present invention.

Refer to FIGS. 2(a) and 2(b). FIG. 2(a) shows an exploded view of the present invention, and FIG. 2(b) shows a perspective cross-section of the present invention. The micro-motor of the present invention is comprised of a stator 100 and a rotor 200. The stator 100 is comprised of a first magnetically conductive assembly 110, a bobbin 130 and a second magnetically conductive assembly 120. The first and second magnetically conductive assemblies 110, 120 are respectively comprised of a plurality of magnetically conductive sheets 115 stacked together. The bobbin 130 is disposed on the first magnetically conductive assembly 110 along an axis (not shown) parallel to the central axis (not shown) of the first magnetically conductive assembly 110. The bobbin 130 is wound with at least one coil (not shown). The second magnetically conductive assembly is axially disposed on the bobbin. The bobbin 130 and the first and second magnetically conductive assemblies 110, 120 thereby form a stator adapted to the function of an axially coiled motor.

Figure 3A:
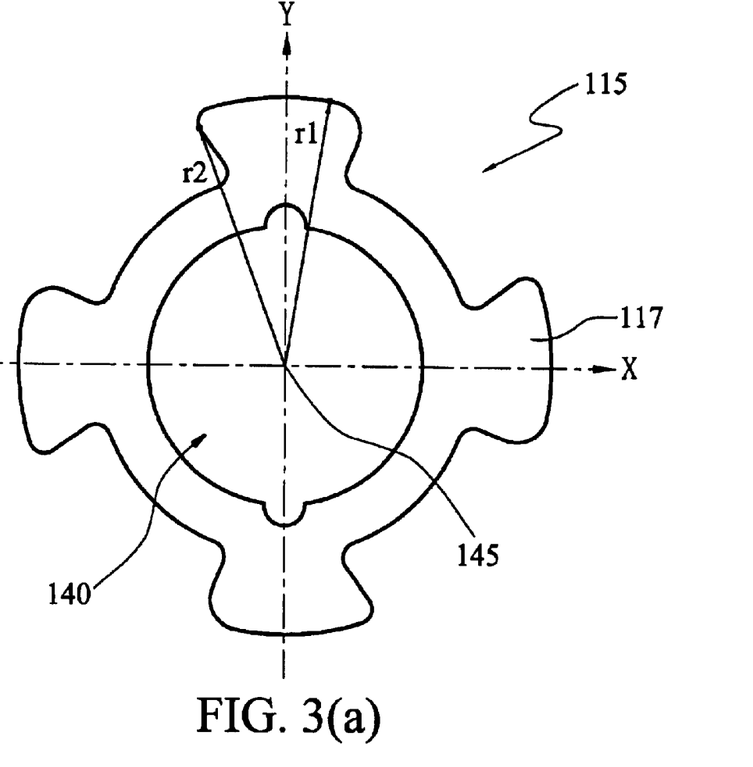
FIG. 3(a) shows the upper view of a magnetically conductive sheet of the present invention.

FIG. 3(a) is the upper view of a magnetically conductive sheet of the present invention. Each of the magnetically conductive sheets is comprised of a central opening 140, e.g. a round opening, and several "asymmetrical" salient teeth 117. The profile of opening 140 has a geometric center 145. Obviously, the geometric center 145 is a circle's center if the opening 140 is round. The word "asymmetrical" can be explained in several different ways. For example, it means that the distances from the edges of the salient tooth 117 to the geometric center 145 are not constant, i.e. r1≠r2. Alternately, one side of the salient tooth 117 is wide and the other side is narrow. Alternately, any line passing through the center 145, e.g. line X or Y in the figure, cannot divide the profile of a salient tooth 117 into mirror images.

Figure 3B:
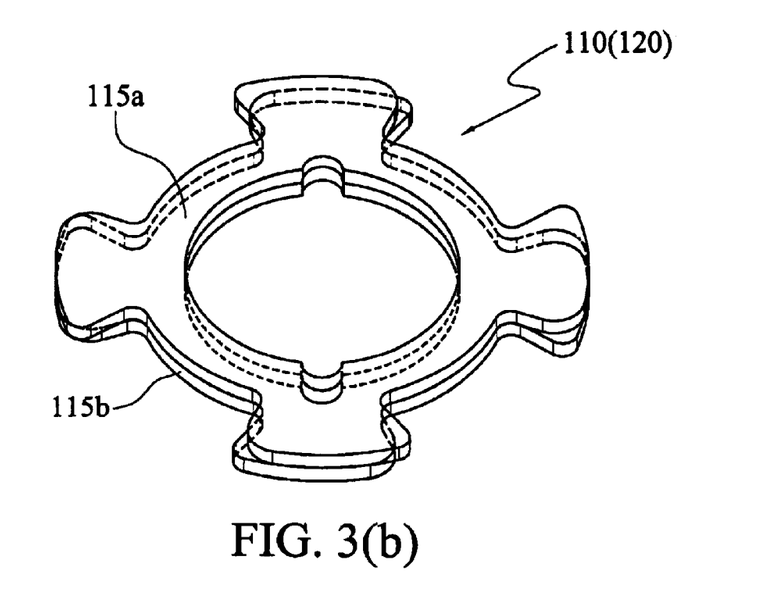
FIG. 3(b) shows the perspective view of a magnetically conductive assembly of the present invention.

FIG. 3(b) shows the perspective view of the first magnetically conductive assembly 110 (or the second magnetically conductive assembly 120) of the present invention. The first magnetically conductive assembly 110 comprises a plurality of (e.g. two) magnetically conductive sheets 115 stacked together, and at least one of the magnetically conductive sheets 115 is disposed reversely relative to the others. In the figure, the reverse disposition is illustrated with solid and dash lines. Note that the upper and lower sheets 115a, 115b are of the same profile but disposed in reverse directions. The structure of the second magnetically conductive assembly 120 is similar to that of the first magnetically conductive assembly 110, and unnecessary description is omitted here.

Figure 3C:
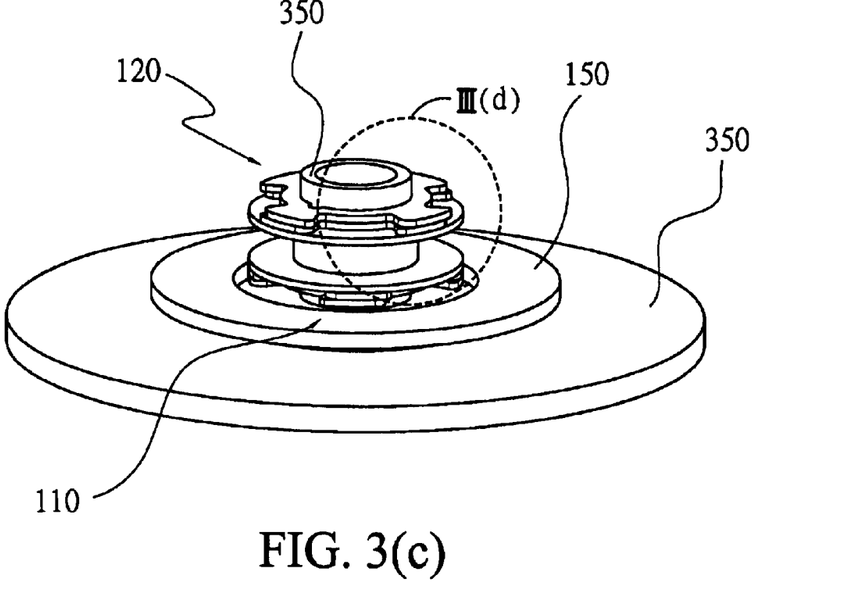
FIG. 3(c) illustrates a stator of the present invention.
Figure 3D:
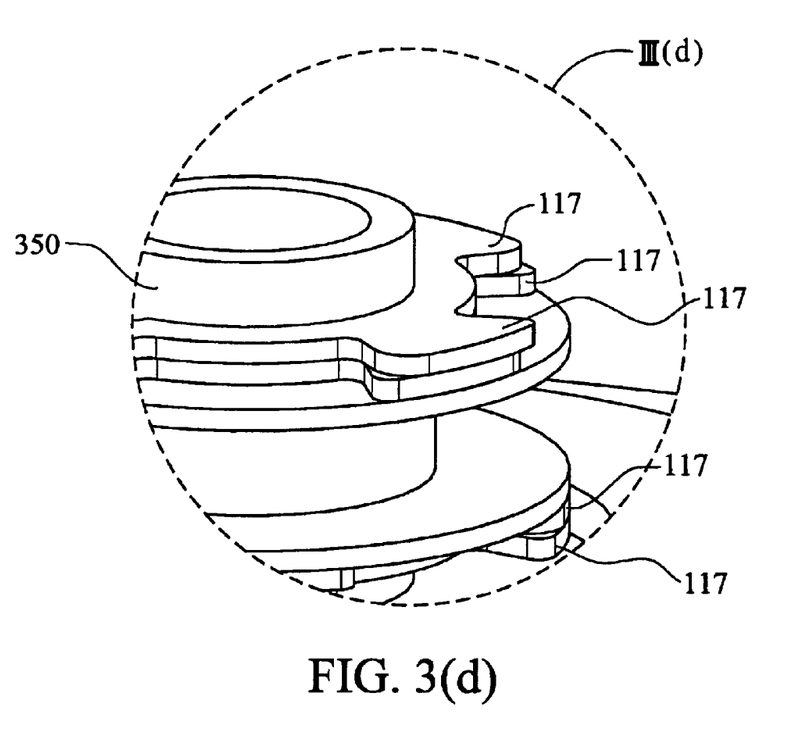
FIG. 3(d) is a local enlarged diagram of FIG. 3(c)

As well, the structure of the stator 100 is shown in FIGS. 3(c) and 3(d). In the embodiment, the first and second magnetically conductive assemblies 110, 120 may both have n salient teeth 117 disposed on the magnetically conductive sheets 115, such that the whole stator 100 is provided with 2n salient poles formed by the teeth 117. The magnetically conductive sheets may be made from materials of permeability, such as silicon steel or nickel steel.

Moreover, as shown in FIGS. 2(a) and 2(b), the rotor 200 is coupled to the stator 100. The rotor 200 is comprised of a magnetic sheet 210, an iron shell 220, and a shaft 230. The magnetic sheet 210 is coupled to the stator 100 along the central axis thereof (not shown). The iron shell 220 covers the upper and lateral surfaces of the magnetic sheet 210. The shaft 230 is used to couple the rotor 200 to the stator 100. Furthermore, the shaft 230 may be formed to protrude from the iron shell 220. In assembly, the shaft 230 is disposed to pass through the first magnetically conductive assembly 110, bobbin 130, and second magnetically conductive assembly 120.

Furthermore, as shown in FIGS. 2(a) and 2(b), the micro-motor of the present invention may further comprise a circuit is board 150, a base 300, and a sleeve 500. The base 300 supports the circuit board 150, and the circuit board 150 has a driving IC and a Hall element (not shown), which are respectively used to drive the stator and detect the magnetic field of the stator.

In FIG. 2(a), the base 300 is further provided with a shaft tube 350. As shown in the figure, the shaft tube is coupled with the first magnetically conductive assembly 110, bobbin 130, and second magnetically conductive assembly 120 with its outer surface. As well, the inner space of shaft tube 350 is used to contain the sleeve 500. The shaft 230 connected to the rotor 200 with one end, passes through the sleeve 500 so as to couple the rotor 200 to the stator 100.

Figure 4A:
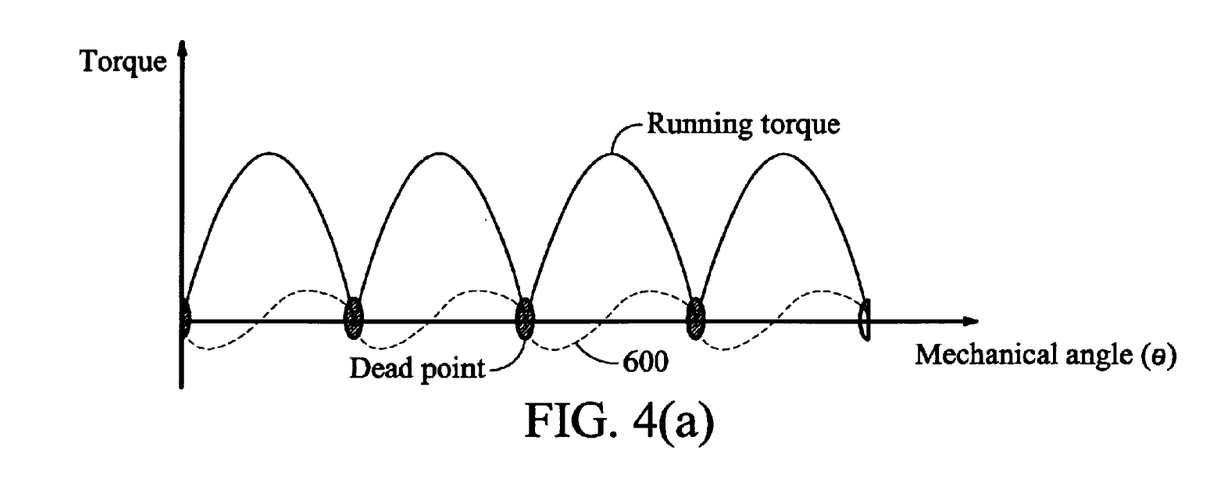
FIG. 4(a) depicts the relationship of the cogging and running torques and the mechanical angle of the conventional motor.
Figure 4B:
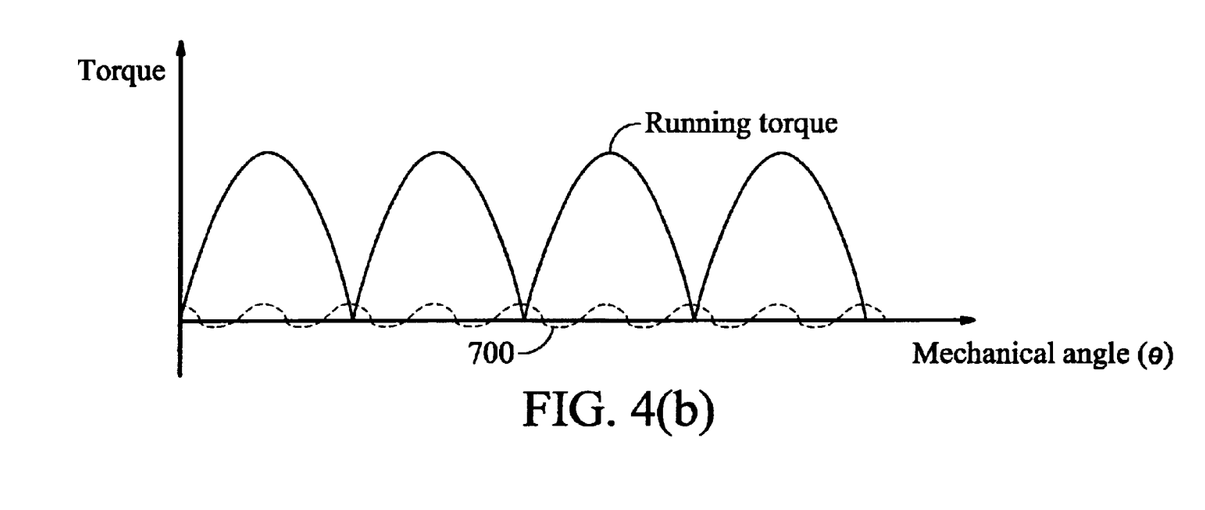
FIG. 4(b) depicts the relationship of the cogging and running torques and the mechanical angle of the micro-motor of the present invention.

In FIGS. 4(a) and 4(b), the curve 700 indicates the cogging torque of the present invention, while the curve 600 indicates that of a conventional micro-motor. According to the curves, it is obvious that the cogging torque's amplitude measured from the operation of the present invention is lower than that of the conventional micro-motor. Furthermore, as shown in the figures, the cogging torque curve of the present invention performs a frequency shift, such that dead points (at which some of the zero-amplitude points of a motor's cogging torque and running torque coincide as shown in FIG. 4(a)) of the micro-motor are eliminated and the motor's performance is improved. The design of the stacking structure in the magnetically conductive assemblies provides the micro-motor with better efficiency of cogging torque reduction.

While the invention has been described with reference to a preferred embodiment, the description is not intended to be construed in a limiting sense. It is therefore contemplated that the appended claims will cover any such modifications or embodiments as may fall within the scope of the invention defined by the following claims and their equivalents.

What is claimed is:

1. A micro-motor, comprising:
   a stator, including:
      a first magnetically conductive assembly including a plurality of asymmetrically magnetically conductive sheets stacked together, wherein at least one of the magnetically conductive sheets is disposed reversely relative to the other magnetically conductive sheets;
      a coil axially disposed on the first magnetically conductive assembly;
      A second magnetically conductive assembly disposed on the coil, and including a plurality of magnetically conductive sheets stacked together, wherein at least one of the magnetically conductive sheets is disposed reversely relative to the other magnetically conductive sheets; and
   a rotor coupled to the stator.

2. The micro-motor of claim 1, wherein the coil is wound around a bobbin.

3. The micro-motor of claim 1, wherein the rotor further includes:
   a magnetic sheet coupled to the stator;
   an iron shell covering the magnetic sheet; and
   a shaft coupling the rotor to the stator.

4. The micro-motor of claim 1, further comprising:
   a base;
   a sleeve disposed on the base and coupled to the shaft; and
   a circuit board disposed on the base, driving the stator and detecting a magnetic field thereof.

5. The micro-motor of claim 4, wherein the base is further provided with a shaft tube passing through the first magnetically conductive assembly, the coil, and the second magnetically conductive assembly, wherein the shaft is contained in the shaft tube.

6. The micro-motor of claim 1, wherein the magnetically conductive sheets have a central opening, respectively.

7. The micro-motor of claim 1, wherein each of the magnetically conductive sheets has a plurality of salient teeth, each of which is profiled with an asymmetrical shape.

8. The micro-motor of claim 1, wherein the magnetically conductive sheets are made of one material selected from silicon steel, nickel steel, and a combination thereof.

9. A micro-motor, comprising:
   a stator, including:
      a first magnetically conductive assembly including a plurality of magnetically conductive sheets stacked together, each of which has a plurality of a symmetrical salient teeth, wherein at least one of the magnetically conductive sheets is disposed reversely relative to the other magnetically conductive sheets;
      a bobbin disposed on the first magnetically conductive assembly and having at least one coil;
      a second magnetically conductive assembly disposed on the bobbin and including a plurality of the magnetically conductive sheets stacked together, each of which has a plurality of asymmetrical salient teeth, wherein at least one of the magnetically conductive sheets is disposed reversely relative to the other magnetically conductive sheets; and
   a rotor coupled to the stator.

10. The micro-motor of claim 9, wherein the rotor further includes:
    a magnetic sheet coupled to the stator;
    an iron shell covering the magnetic sheet; and
    a shaft coupling the rotor to the stator.

11. The micro-motor of claim 9, further comprising:
    a base;
    a sleeve disposed on the base and coupled to the shaft; and
    a circuit board disposed on the base, driving the stator and detecting a magnetic field thereof.

12. The micro-motor of claim 11, wherein the base is further provided with a shaft tube passing through the first magnetically conductive assembly, the coil, and the second magnetically conductive assembly, wherein the shaft is contained in the shaft tube.

13. The micro motor of claim 9, wherein the magnetically conductive sheets have a central opening, respectively.

14. The micro-motor of claim 9, wherein each of the magnetically conductive sheets has a plurality of salient teeth, each of which is profiled with an asymmetrical shape.

15. The micro-motor of claim 9, wherein the magnetically conductive sheets are made of one material selected from silicon steel, nickel steel, and a combination thereof.

16. A motor comprising:
    a stator including:
       a plurality of asymmetrically magnetically conductive sheets stacked together, wherein at least one of the magnetically conductive sheets is disposed reversely relative to other magnetically conductive sheets: and
    a coil coupled to the plurality of magnetically conductive sheets; and
    a rotor coupled to the stator.

17. The motor of claim 16, wherein each of the plurality of magnetically conductive sheets has a plurality of asymmetrical salient teeth.

* * * * *